US012796586B2

(12) United States Patent
Johnson

(10) Patent No.: US 12,796,586 B2
(45) Date of Patent: Nov. 17, 2026

(54) ADJUSTABLE GARDENING TOOL AND METHOD THEREFOR

(71) Applicant: Terry Johnson, Helena, MT (US)

(72) Inventor: Terry Johnson, Helena, MT (US)

( * ) Notice: Subject to any disclaimer, the term of this patent is extended or adjusted under 35 U.S.C. 154(b) by 266 days.

(21) Appl. No.: 18/735,380

(22) Filed: Jun. 6, 2024

(65) Prior Publication Data

US 2025/0374849 A1 Dec. 11, 2025

(51) Int. Cl.
*A01C 5/02* (2006.01)

(52) U.S. Cl.
CPC .................................... *A01C 5/02* (2013.01)

(58) Field of Classification Search
CPC .................................................... A01C 5/02
See application file for complete search history.

(56) References Cited

U.S. PATENT DOCUMENTS 1,564,721 A * 12/1925 Tallon ..................... A01C 5/02 33/669
6,073,702 A * 6/2000 Petruzzelli ............... A01C 5/02 172/381
2006/0272560 A1* 12/2006 Steiner ..................... A01C 5/02 111/92
2008/0143128 A1* 6/2008 Kuhns ....................... B08B 1/30 294/51

* cited by examiner

*Primary Examiner* — Matthew R Buck

(57) ABSTRACT

An adjustable gardening tool includes an elongated support frame, a support arm structure attached to and extending vertically from the support frame, a handle connected to the support arm structure, and a hole-making assembly. The hole-making assembly includes an elongated support piece adjustably mounted on the support frame to permit selective vertical adjustment of the support piece, and further includes a plurality of prongs projecting downwardly beyond a bottom edge of the support frame and is adjustably mounted on the support piece to permit selective horizontal adjustment of the prongs to adjust the relative spacing of the prongs.

11 Claims, 8 Drawing Sheets

ADJUSTABLE GARDENING TOOL AND METHOD THEREFOR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gardening tools and more particularly pertains to a new adjustable gardening tool for allowing a user to create a row of seed holes of a selected spacing and depth.

(2) Description of Related Art Including Information Disclosed Under 37 CFR 1.97 and 1.98

The prior art relates to gardening tools. The prior art, as best understood, does not disclose adjustable gardening tool for allowing a user to create a row of seed holes of a selected spacing and depth all at the same time.

BRIEF SUMMARY OF THE INVENTION

An embodiment of the disclosure meets the needs presented above in a adjustable gardening tool generally comprising an elongated support frame, a support arm structure attached to and extending vertically from the support frame, a handle connected to the support arm structure, and a hole-making assembly. The hole-making assembly includes an elongated support piece adjustably mounted on the support frame to permit selective vertical adjustment of the support piece, and further includes a plurality of prongs projecting downwardly beyond a bottom edge of the support frame and is adjustably mounted on the support piece to permit selective horizontal adjustment of the prongs to adjust the relative spacing of the prongs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
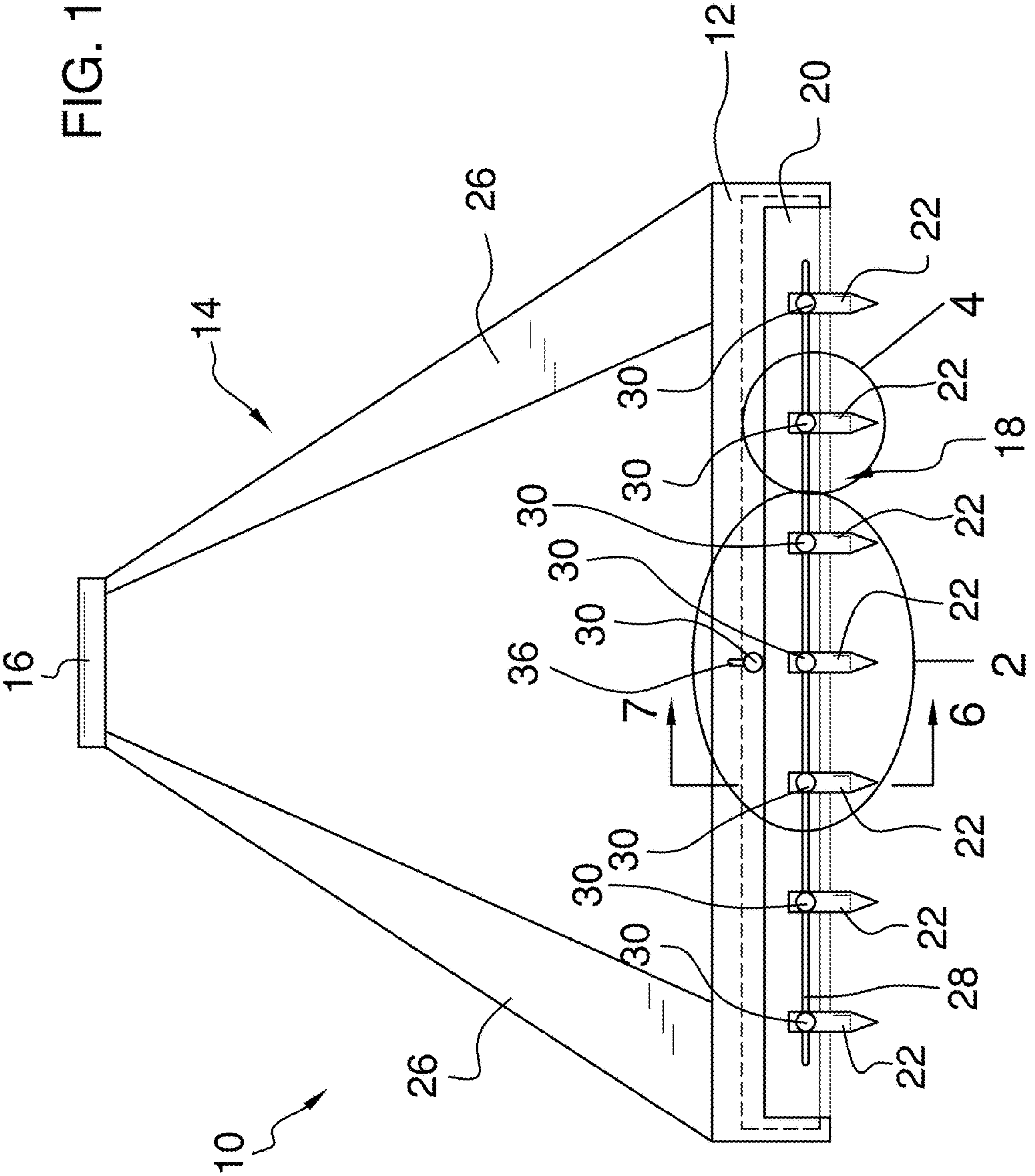
FIG. 1 is a front view of an adjustable gardening tool according to an embodiment of the disclosure.

With reference now to the drawings, and in particular to FIGS. 1 through 11 thereof, a new adjustable gardening tool embodying the principles and concepts of an embodiment of the disclosure and generally designated by the reference numeral 10 will be described.

As best illustrated in FIGS. 1 through 11, the adjustable gardening tool 10 generally comprises an elongated support frame 12, a support arm structure 14 attached to and extending vertically from the support frame 12, a handle 16 connected to the support arm structure 14, and a hole-making assembly 18. The hole-making assembly 18 includes an elongated support piece 20 adjustably mounted on the support frame 12 to permit selective vertical adjustment of the support piece 20, and further includes a plurality of prongs 22 projecting downwardly beyond a bottom edge 24 of the support frame 12 and is adjustably mounted on the support piece 20 to permit selective horizontal adjustment of the prongs 22 to adjust the relative spacing of the prongs 22.

As shown in FIG. 1, the support arm structure 14 includes a pair of arms 26 attached at opposite ends of the support frame 12, and the handle 16 connects the pair of arms 26. Alternatively, the support arm structure 14 could be a single central arm or any number of arms of any shape or contour known in field of gardening tools. The handle 16 could also be of any known design, such as an ergonomic handle.

Figure 4:
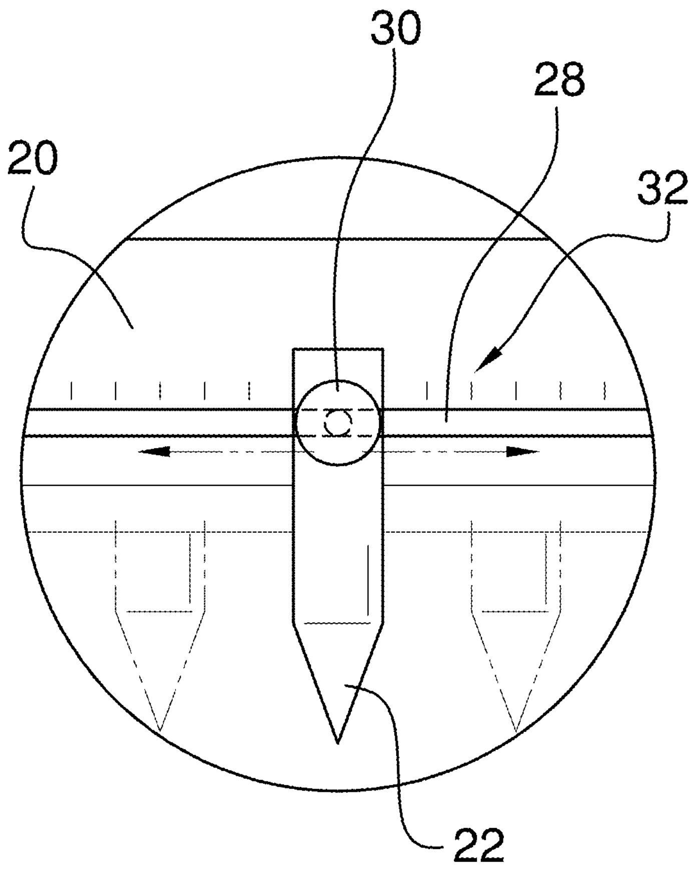
FIG. 4 is a close-up view of a portion an embodiment of the disclosure.
Figure 6:
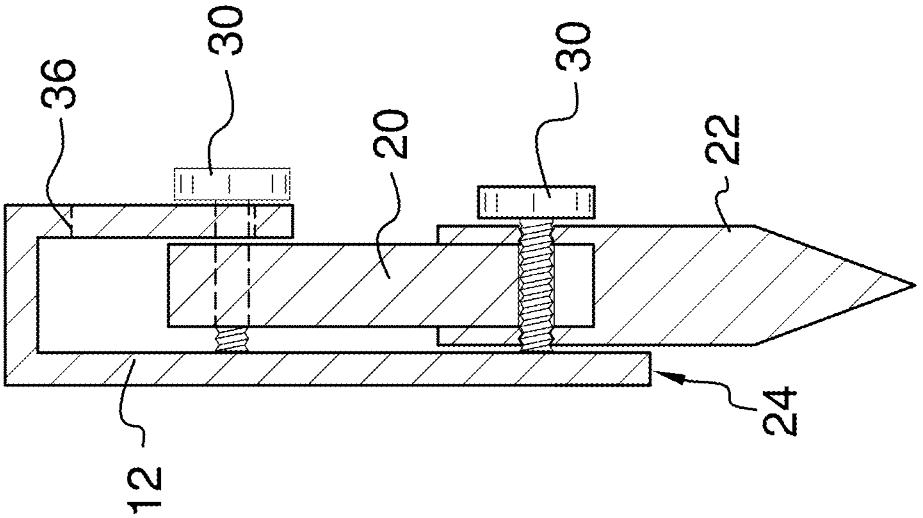
FIG. 6 is a cross-sectional view of a portion of an embodiment of the disclosure.
Figure 5:
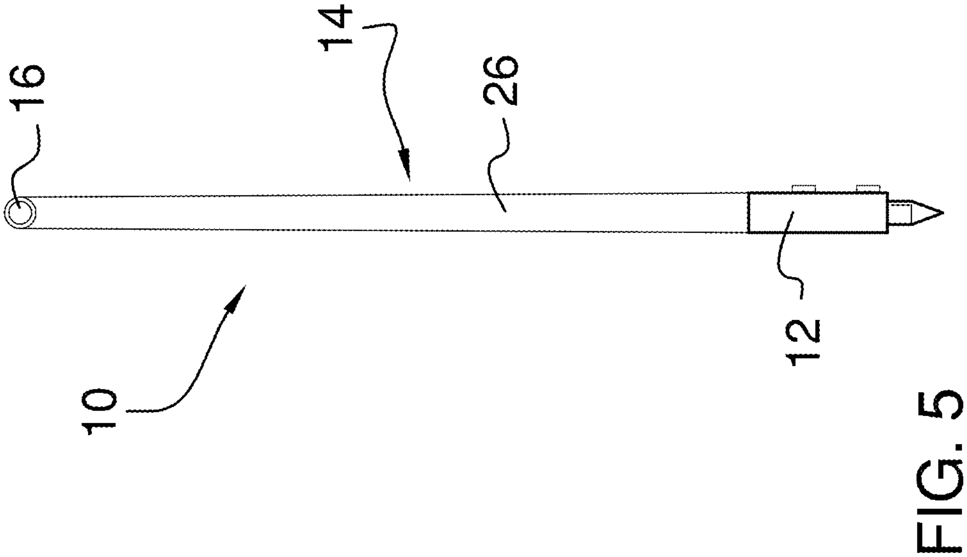
FIG. 5 is a side view of an embodiment of the disclosure.
Figure 7:
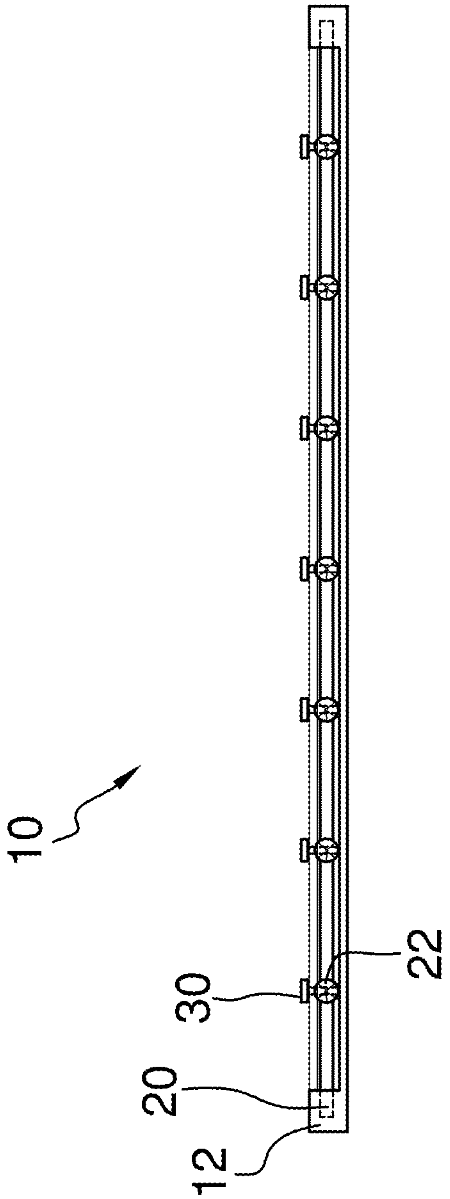
FIG. 7 is a bottom view of an embodiment of the disclosure.

The support piece 20 includes a horizontal slot 28, and each of the prongs 22 includes a releasable locking structure 30 projecting into the horizontal slot 28 to releasably lock the prong 22 in a selected position along the horizontal slot 28. FIG. 6 shows one possible embodiment of a locking structure 30, in this case a thumb screw, though other locking structures 30 such as locking pins or tabs could be used. In this embodiment, the support frame 12 includes a rear panel and the thumb screw can be tightened against it to releasably lock the prong 22 in a selected position. As shown in FIG. 4, the support piece 20 includes a plurality of markings 32 adjacent the horizontal slot 28 indicating where to place the prongs 22 to achieve a selected equivalent spacing of the prongs 22 along the horizontal slot 28. The markings 32 could be any type of measurement, such as inches, half inches, and quarter inches. In addition, the markings 32 could be specially marked with colors or numbers corresponding to individual prongs 22 in order to let a user quickly and easily adjust the prongs 22 to an equivalent spacing without needing to measure or calculate the distances.

Figure 11:
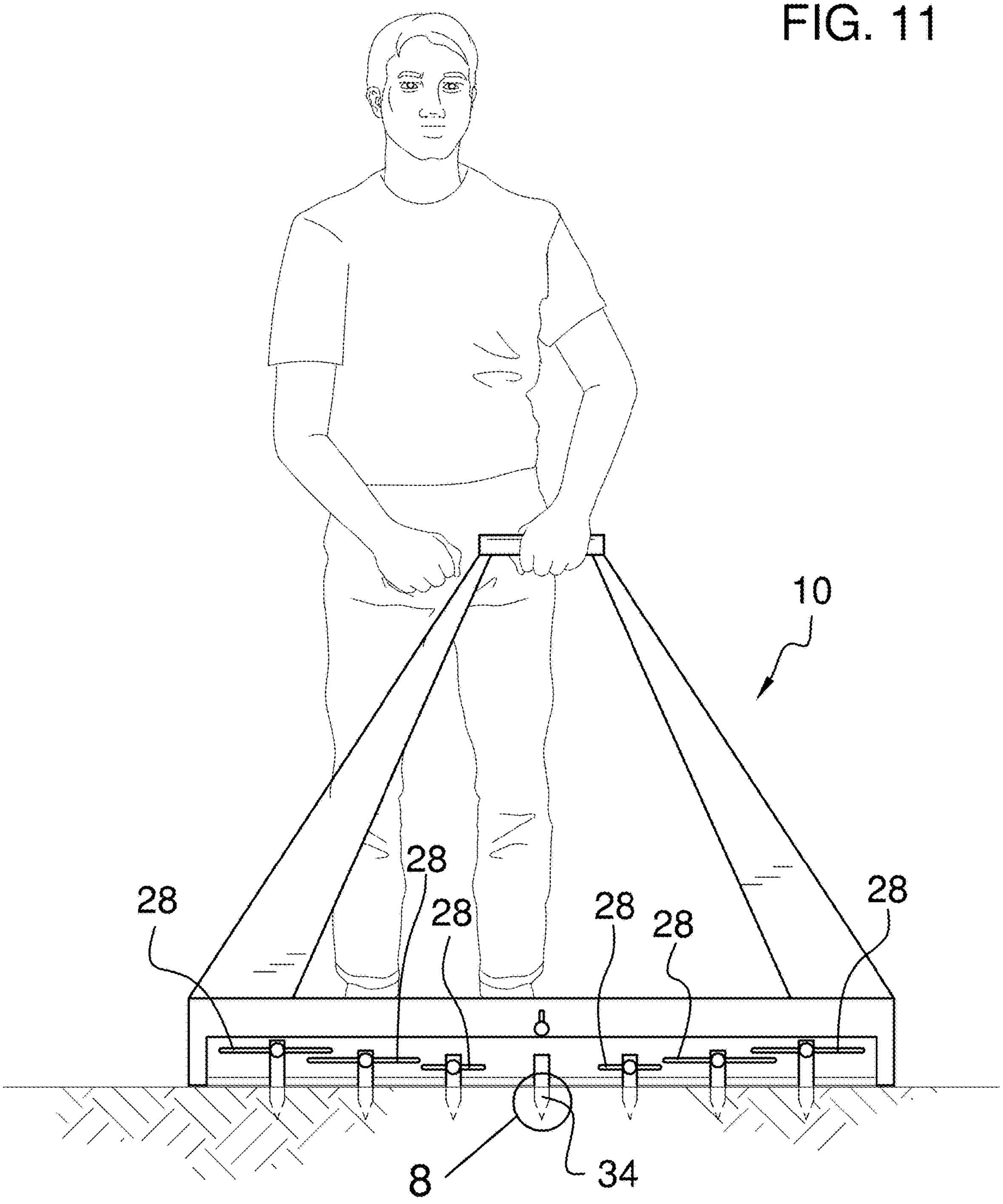
FIG. 11 is a front view of an alternative embodiment of the disclosure in use.

FIG. 11 additionally shows an embodiment in which the horizontal slot 28 is divided into at least two horizontal slots 28 and the prongs 22 further include a fixed central prong 34 disposed between the at least two horizontal slots 28. In the embodiment in FIG. 11, there are a plurality of individual horizontal slots 28, though in another embodiment there is a space dividing the single horizontal slot 28 of FIG. 1 into only two horizontal slots 28. In the embodiment in FIG. 11, each of the horizontal slots 28 can be designed to progressively increase in length from the center of the support piece 20 to limit the horizontal adjustment of the prongs 22 and make it easier for the user to create identical relative spacing between each pair of adjacent prongs 22. To further explain, for every unit of distance increase from the fixed central prong 34, each successive pair of prongs 22 must be moved exponentially, such as two or four times the unit of distance, in order to maintain equal spacing between adjacent pairs of prongs 22. For example, if all the prongs 22 are three inches apart from one another and an increase to a four-inch spacing is desired, then the innermost pair of prongs 22 are moved one inch each away from the central prong 34. The next middle pair of prongs 22 would then have to be moved two inches from their original position, and the outermost pair of prongs 22 would have to be moved four inches from their original position. Accordingly, in the embodiment where there are a plurality of the horizontal slots 28, one for each prong 22, the horizontal slots 28 would have to be increasingly longer as shown to permit the greater adjustment. In addition, the horizontal slots 28 are offset from one another and the prongs 22 are slightly longer so that the points of the prongs 22 remain in alignment with one another, which offset slots 28 can have their own individual sets of markings 32 so the user can quickly adjust each prong 22 to achieve a selected equivalent spacing.

Figure 2:
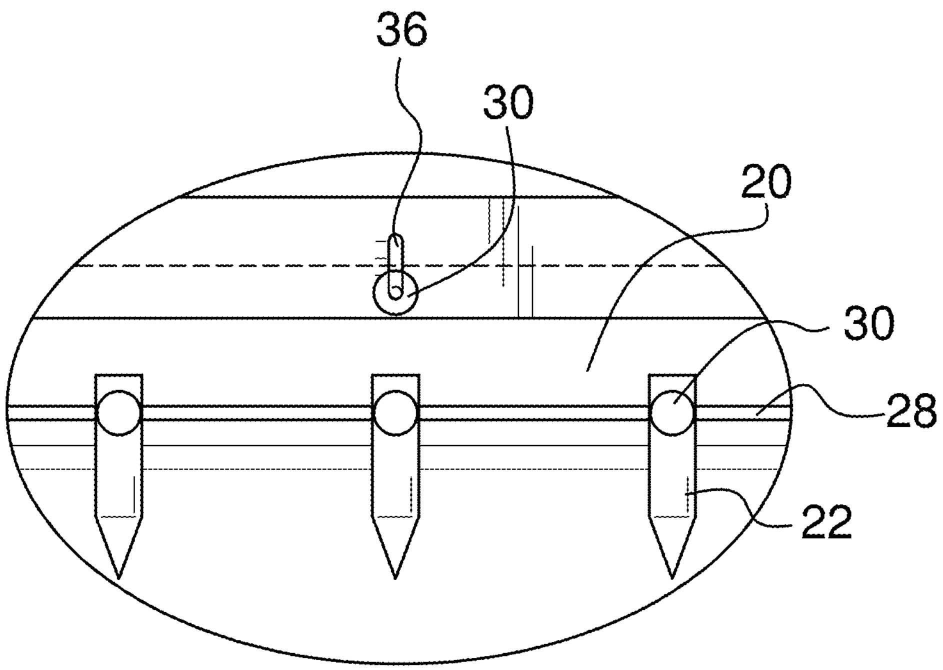
FIG. 2 is a close-up view of a portion an embodiment of the disclosure.
Figure 3:
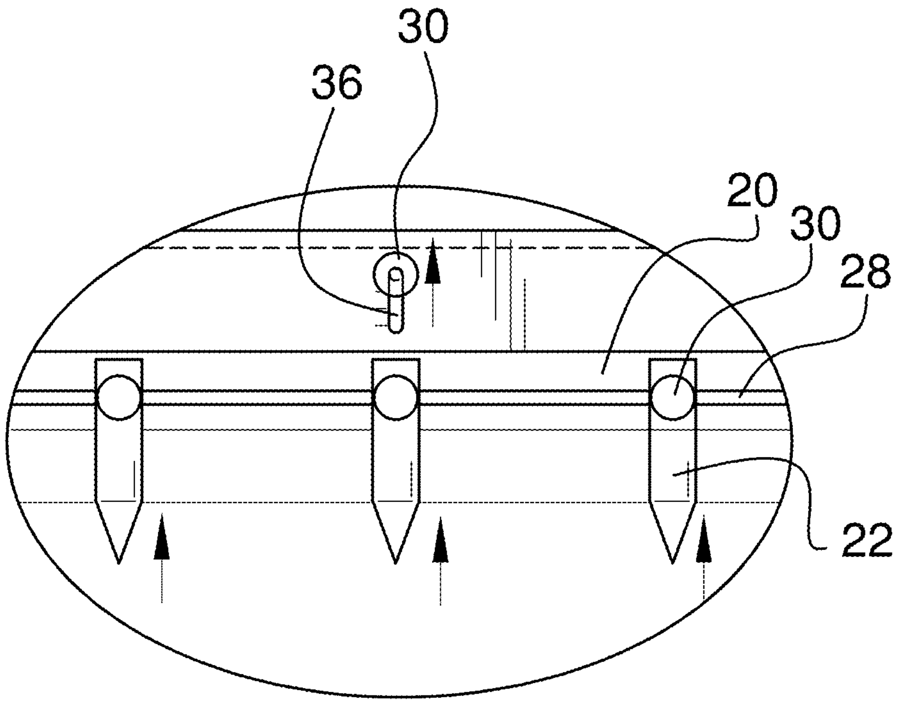
FIG. 3 is a close-up view of a portion an embodiment of the disclosure.

As shown in FIGS. 2 and 3, the support frame 12 includes a vertical slot 36 and the support piece 20 also includes a releasable locking structure 30 projecting into the vertical slot 36 to releasably lock the support piece 20 in a selected position along the slot. As shown in FIG. 6, the locking structure 30 in this case is also in the form of a thumb screw. It should be noted at this time that the various means to adjust the vertical and horizontal positions of the prongs 22 as shown in the figures are possible exemplary embodiments and should not be construed as limiting the disclosure to only the designs shown. Other adjustment systems and configurations that are well known in the mechanical arts could be utilized to permit selective adjustment of the positions of the prongs 22.

Figure 8:
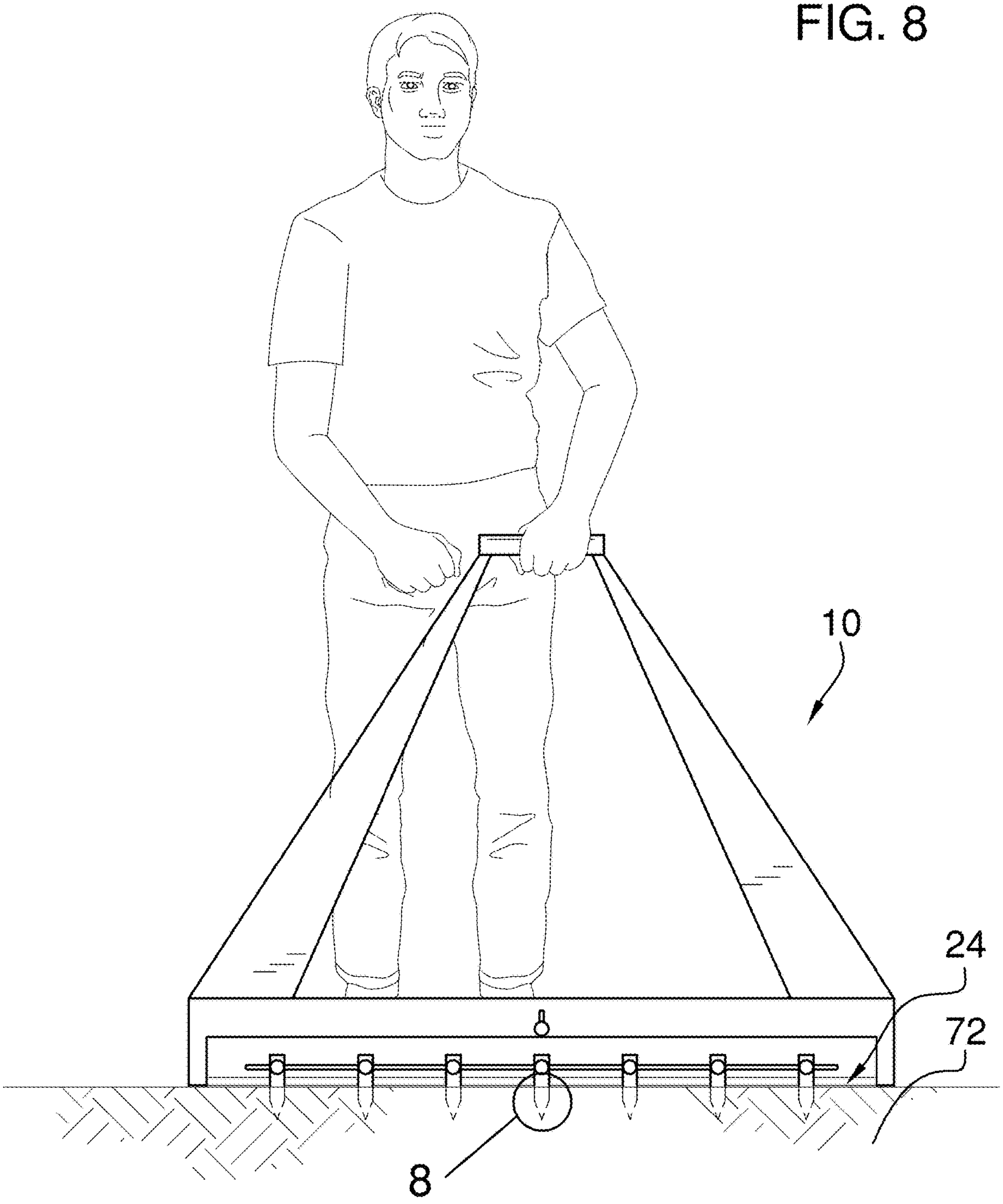
FIG. 8 is a front view of an embodiment of the disclosure in use.
Figure 9:
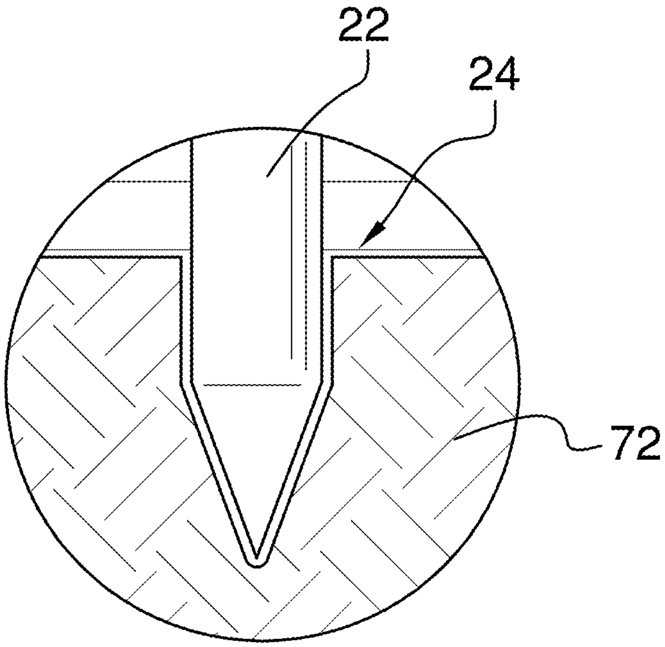
FIG. 9 is a view of a portion of an embodiment of the disclosure in use.
Figure 10:
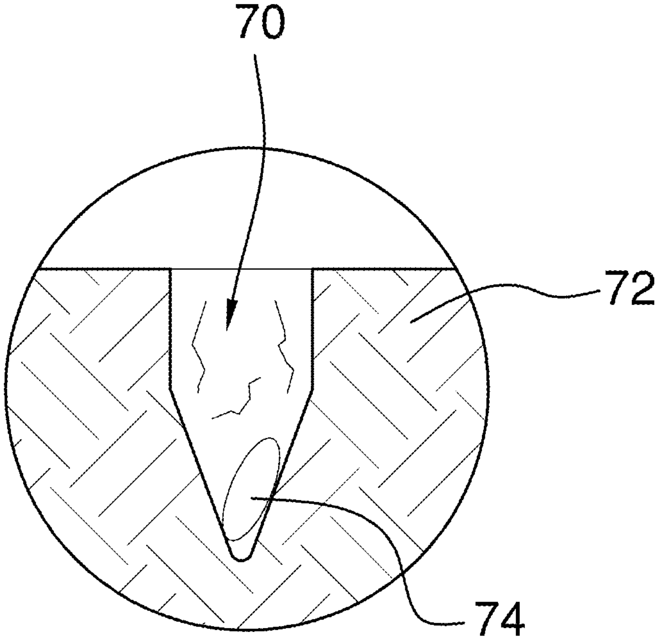
FIG. 10 is a view of seed hole created by an embodiment of the disclosure.

The adjustable gardening tool 10 can be used to create aligned seed holes 70 in ground 72 that is to be seeded. The user vertically adjusts and releasably locks the support piece 20 in a selected vertical position wherein the prongs 22 project downwardly a selected distance beyond a bottom edge 24 of the support frame 12 corresponding to a selected seed hole depth. The user also horizontally adjusts and releasably locks the prongs 22 in a selected horizontal position wherein the prongs 22 are at a selected spacing, such as an equivalent spacing between adjacent prongs 22, corresponding to a selected spacing of seed holes 70 in a row of seed holes 70. As shown in FIG. 8, the user then presses the adjustable gardening tool 10 and thereby presses the prongs 22 into ground to be seeded, which thereby creates a row of seed holes 70 of the selected depth and spacing. The user can press solely on the handle 16 or can alternatively or additionally press on the support frame 12 with the user's foot. The user presses on the adjustable gardening tool 10 until the bottom edge 24 of the support frame 12 contacts the ground 72 as shown in FIG. 9, which thereby creates a seed hole 70 of the selected depth. The user can then place seeds 74 in the holes 70 as shown in FIG. 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable gardening tool comprising:

an elongated support frame;

a support arm structure attached to and extending vertically from said support frame;

a handle connected to said support arm structure;

a hole-making assembly comprising an elongated support piece adjustably mounted on said support frame to permit selective vertical adjustment of said support piece, and further comprising a plurality of prongs projecting downwardly beyond a bottom edge of said support frame and being adjustably mounted on said support piece to permit selective horizontal adjustment of said prongs to adjust the relative spacing of said prongs; and wherein said support frame comprises a vertical slot and said support piece comprises a releasable locking structure projecting into said vertical slot to releasably lock said support piece in a selected position along said slot.

2. The adjustable gardening tool of claim 1, wherein said support piece comprises a horizontal slot and each of said prongs comprises a releasable locking structure projecting into said horizontal slot to releasably lock said prong in a selected position along said horizontal slot.

3. The adjustable gardening tool of claim 2, wherein said locking structure comprises a thumb screw.

4. The adjustable gardening tool of claim 2, wherein said support piece comprises a plurality of markings adjacent said horizontal slot indicating where to place said prongs to achieve a selected equivalent spacing of said prongs along said horizontal slot.

5. The adjustable gardening tool of claim 2, wherein said horizontal slot is divided into at least two horizontal slots and said prongs further comprise a fixed central prong disposed between said at least two horizontal slots.

6. The adjustable gardening tool of claim 1, wherein said locking structure comprises a thumb screw.

7. The adjustable gardening tool of claim 1, wherein said support arm structure comprises a pair of arms attached at opposite ends of said support frame, and said handle connects said pair of arms.

8. A method of using an adjustable gardening tool to create aligned seed holes, said method comprising the steps of:

having the adjustable gardening tool including
- an elongated support frame;
- a support arm structure attached to and extending vertically from said support frame;
- a handle connected to said support arm structure; and
- a hole-making assembly comprising an elongated support piece adjustably mounted on said support frame to permit selective vertical adjustment of said support piece, and further comprising a plurality of prongs projecting downwardly beyond a bottom edge of said support frame and being adjustably mounted on said support piece to permit selective horizontal adjustment of said prongs to adjust the relative spacing of said prongs;

vertically adjusting and releasably locking said support piece in a selected vertical position wherein said prongs project downwardly a selected distance beyond a bottom edge of said support frame corresponding to a selected seed hole depth;

horizontally adjusting and releasably locking said prongs in a selected horizontal position wherein said prongs are at a selected spacing corresponding to a selected spacing of seed holes in a row of seed holes; and pressing on the adjustable gardening tool and thereby pressing said prongs into ground to be seeded and thereby creating a row of seed holes of the selected depth and spacing.

9. The method of claim 8, wherein said step of horizontally adjusting said prongs comprises spacing each pair of adjacent prongs the same distance apart.

10. An adjustable gardening tool comprising:

an elongated support frame;

a support arm structure attached to and extending vertically from said support frame, wherein said support arm structure comprises a pair of arms attached at opposite ends of said support frame;

a handle connected to said support arm structure, said handle connecting said pair of arms; and a hole-making assembly comprising an elongated support piece adjustably mounted on said support frame to permit selective vertical adjustment of said support piece, and further comprising a plurality of prongs projecting downwardly beyond a bottom edge of said support frame and being adjustably mounted on said support piece to permit selective horizontal adjustment of said prongs to adjust the relative spacing of said prongs, wherein:
- said support piece comprises a horizontal slot and each of said prongs comprises a releasable locking structure projecting into said horizontal slot to releasably lock said prong in a selected position along said horizontal slot, said locking structure comprises a thumb screw, and said support piece comprises a plurality of markings adjacent said horizontal slot indicating where to place said prongs to achieve a selected equivalent spacing of said prongs along said horizontal slot,
- said support frame comprises a vertical slot and said support piece comprises a releasable locking structure projecting into said vertical slot to releasably lock said support piece in a selected position along said slot, wherein said locking structure comprises a thumb screw.

11. The adjustable gardening tool of claim 10, wherein said horizontal slot is divided into at least two horizontal slots and said prongs further comprise a fixed central prong disposed between said at least two horizontal slots.

* * * * *